United States Patent Office 3,212,655
Patented Oct. 19, 1965

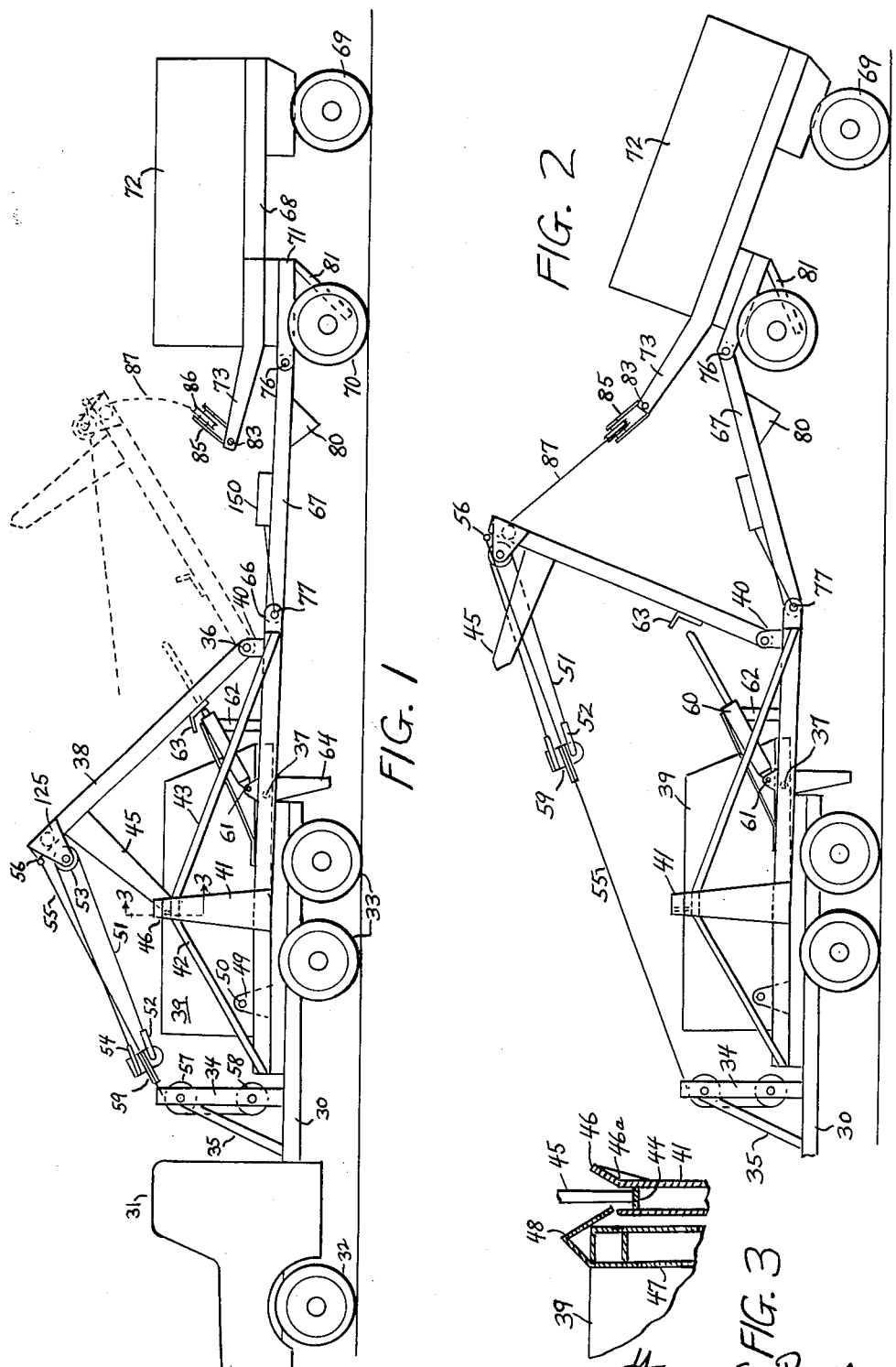

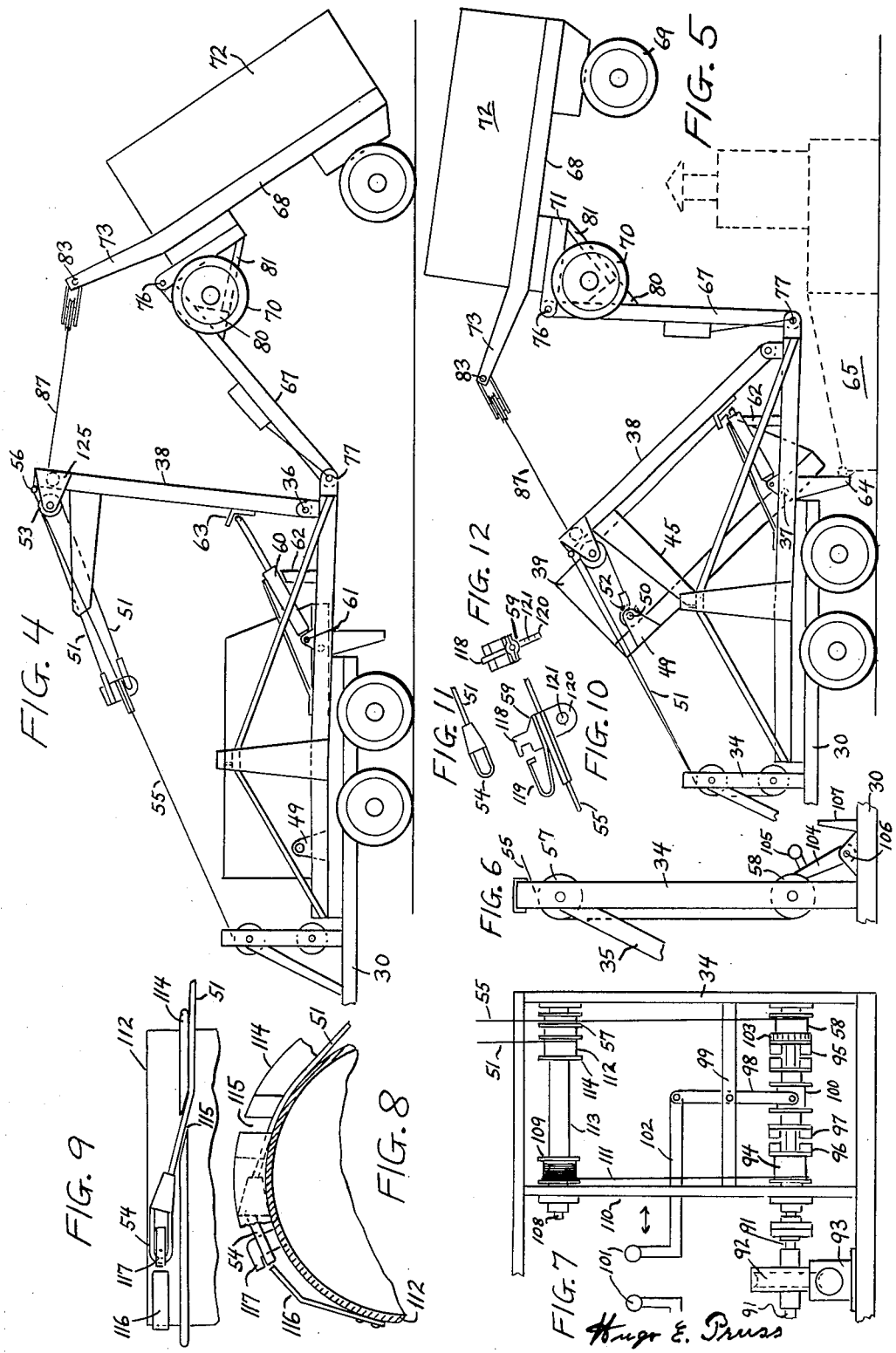

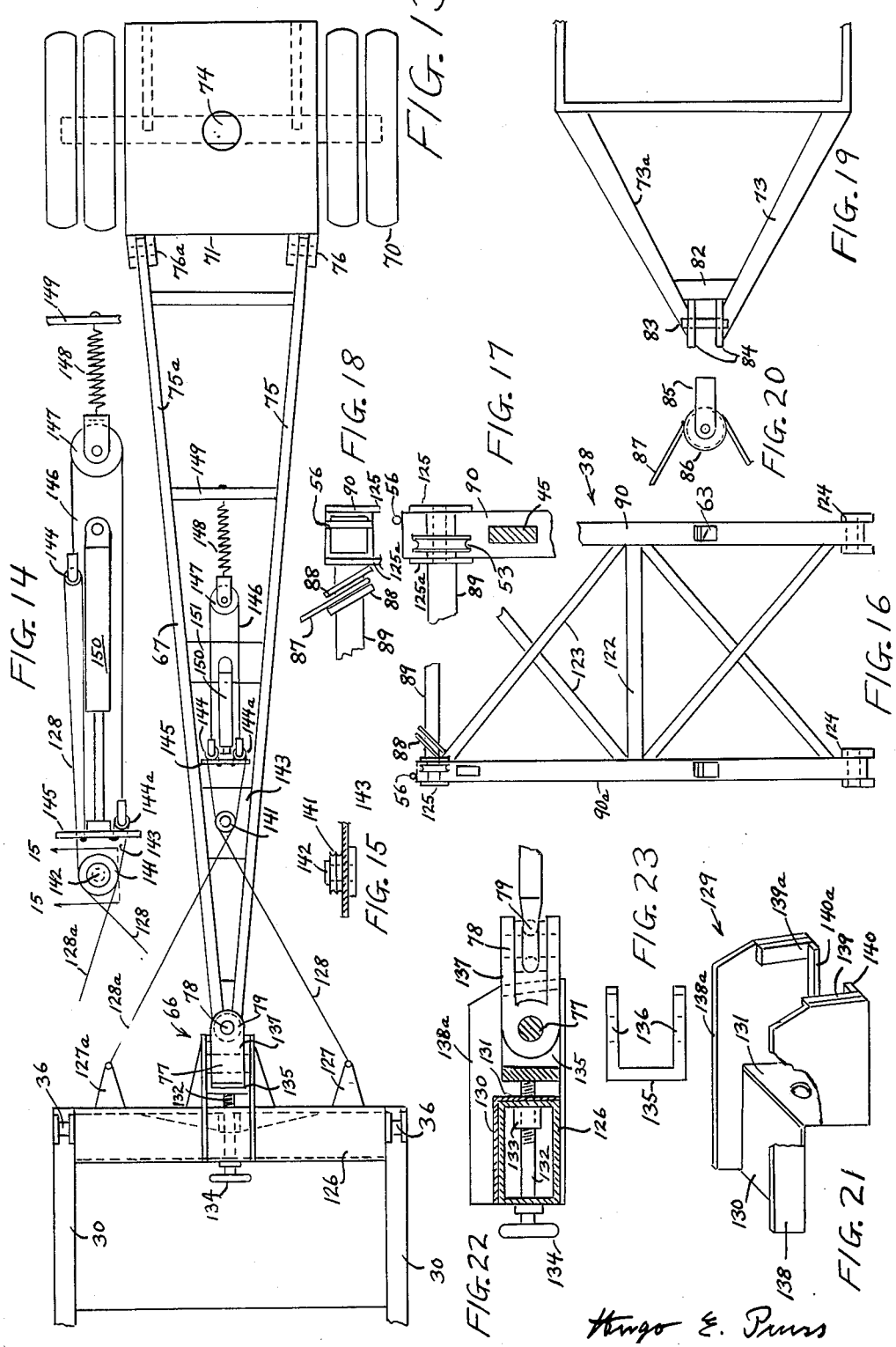

3,212,655
BULK-HAULING DUMP VEHICLES
Hugo E. Pruss, Orinda, Calif., assignor of seventeen and one-half percent to Oswald H. Milmore, Piedmont, Calif.
Filed Sept. 3, 1963, Ser. No. 306,231
11 Claims. (Cl. 214—44)

The invention relates to bulk-hauling vehicles which have tiltable dumping bodies and is, more particularly, concerned with the combination of a trailer and a towing vehicle, both equipped with dumping bodies, and with said vehicle individually when adapted for use in said combination. The said towing vehicle may be an automotive tractor or a semi-trailer.

The invention is, further, concerned with improvements in the means for coupling a trailer to a towing vehicle and with mechanism for immobilizing the draw-bar of a trailer against swinging motion relatively to the towing vehicle.

The invention is directed to improvements in the bulk-hauling and dumping vehicle and trailer described in my U.S. application for patent, Serial No. 149,010, filed October 31, 1961, (Patent No. 3,103,288) and the disclosures thereof are incorporated herein by reference.

The limitations on maximum vehicle loads permissible on highways and their effect on body lengths are explained in the said patent. While the constructions described therein permit a more effective utilization of potential capacities within the permitted limitatons, and greatly facilitate the dumping of the loads from the towing vehicle and the trailer by lifting the trailer bodily off the ground while supported by the towing vehicle, they did not achieve the greatest simplicity of mechanical parts, and the weight of these parts detracted from the load-carrying capacity of the vehicle-trailer combination.

Also, the prior design used numerous hydraulic rams, often in pairs for parallel operation. Such rams are prone to varying movements for given fluid pressures upon deterioration due to age and wear. This makes it desirable to avoid paired hydraulic rams for moving parts that should move in unison.

Further, certain inconveniences were found in the operation of connecting the trailer draw-bar to the towing vehicle.

It is the general object of this invention to provide an improved vehicle-trailer combination, both the towing vehicle and trailer being provided with dumping bodies for hauling bulk loads, which utilizes mechanisms that are fewer in number and of less total weight than those previously employed, whereby the load-carrying capacity of the combination is increased without exceeding the limitations imposed by statutes and regulations.

A further object is to provide a bulk-hauling vehicle, adapted to tow a bulk-hauling trailer, of the type described in the aforesaid patent, wherein a single power means or source is used both for tilting forwardly the boom by which the trailer is raised and for tilting the dumping body on the towing vehicle.

A further object is to avoid the use of paired hydraulic rams and to provide a construction whereby a single power device actuates a plurality of parts for movement in unison, such as the laterally spaced parts of the boom and the means for immobilizing the draw-bar relatively to the towing vehicle.

Another object is to provide an improved coupling arrangement between the towing vehicle and trailer, which can be fastened more easily by moving the towing vehicle forwardly relatively to the trailer until the coupling on the draw-bar drops into a recess in the coupling element on the towing vehicle.

Still another object is to provide an improved mechanism for immobilizing the trailer draw-bar against swinging motion relative to the towing vehicle, e.g., to stabilize the draw-bar and trailer when the latter is lifted off the ground by the vehicle and/or when the vehicle-trailer combination is backed up and linear movement of the trailer on the ground is desired. More specifically, it is an object to provide a single powered device, such as a hydraulic ram, for immobilizing the draw-bar and for releasing the bar for swinging motion in the horizontal plane to permit the trailer to be steered while moving on the ground and coupled to the vehicle.

In summary, according to the invention the improved vehicle construction includes a boom, mounted to the vehicle frame on a transverse pivot axis and adapted to raise the trailer bodily off the ground as in the prior construction, the said boom being tilted forwardly by cable means attached to take-up drum means driven by power means which also tilt the dumping body on the vehicle forwardly.

According to a specific embodiment, the power means are arranged to drive two sets of take-up drums, one set winding the boom cables, which tilt the boom forwardly, and the other set the dumping cables, which raise the front end of the vehicular dumping body. The latter cables extend over sheaves mounted on the boom and are usually shorter than the lengths required to reach from the latter take-up drums over the sheaves to the dumping body when the boom is in its rearward position; for this reason the dumping cables are fastened temporarily at their ends to connectors on a suitable part of the vehicle, e.g., on the boom cables, during normal operation of the vehicle and boom, and said ends are fastened to the latter take-up drums and to the dumping body only when the latter is to be raised.

To immobilize the draw-bar against swinging motion relative to the towing vehicle with a minimum of parts, there are provided a pair of immobilizing cables which extend convergingly rearwards from laterally spaced points on the towing vehicle to the draw-bar, and a single power device—such as a hydraulic ram carried by the drawbar—is provided for selectively tightening the immobilizing cables and releasing them. This arrangement, further, preferably includes biasing means for taking the slack out of the immobilizing cables when they are released without appreciably restricting the freedom of swinging motion of the draw-bar while the trailer is towed.

According to an additional feature of the invention, there is provided an improved coupling device which includes a slide frame on the towing vehicle and a coupling element mounted on the front end of the draw-bar, the said element being slidable on the said slide frame and being shaped to drop by gravity into a recess in the slide frame following forward movement of the towing vehicle which causes the coupling element to slide rearwardly on the said frame. A locking device, such as a screw, is provided for securing the coupling element to the frame. It is obvious that the positional relations of the slide frame and coupling element may be reversed, so that the frame is on the drawbar.

The invention will be further described with reference to the accompanying drawings forming a part of this specification and showing a preferred embodiment, wherein:

FIGURE 1 is an elevation of a vehicle-trailer combination according to the invention in travelling position, parts being shown in dotted lines to indicate other positions;

FIGURE 2 is a partial elevation showing the first step of raising the trailer;

FIGURE 3 is a sectional view, on an enlarged scale, taken on the line 3—3 of FIGURE 1, showing parts of the boom abutment post and the dumping body;

FIGURES 4 and 5 are partial elevations showing the intermediate and final positions of the trailer during the raising operation;

FIGURE 6 is an enlarged elevation of the drum standard;

FIGURE 7 is an end elevation of the left half of the drum standard, looking toward the rear of the vehicle;

FIGURE 8 is a further enlarged, fragmentary sectional view of the dumping cable take-up drum;

FIGURE 9 is a plan view corresponding to FIGURE 8;

FIGURE 10 is an enlarged elevation of the connector on the boom cable;

FIGURES 11 and 12 are, respectively, a plan and an end view corresponding to FIGURE 10;

FIGURE 13 is a plan view of the trailer draw-bar and parts of the vehicle and trailer;

FIGURE 14 is an enlarged plan view of parts of FIGURE 13, showing the immobilizing mechanism in a different position;

FIGURE 15 is a sectional view taken on the line 15—15 of FIGURE 14;

FIGURE 16 is a plan view of the boom, part being broken away;

FIGURE 17 is an enlarged plan view of the top left corner of the boom, the projecting arm appearing in section;

FIGURE 18 is an end view, looking from the top of and corresponding to FIGURE 17;

FIGURE 19 is a plan of the front part of the trailer, showing the front frame extensions;

FIGURE 20 is a plan of the hoisting sheave, uncoupled from the extensions of FIGURE 19;

FIGURE 21 is an isometric view of the coupling slide frame on the towing vehicle;

FIGURE 22 is an elevation of the coupler, enlarged in relation to FIGURE 13, parts appearing in section; and FIGURE 23 is a plan of the coupling slide element.

Referring to FIGURE 1, the towing vehicle is represented as a motor truck having a chassis frame 30, a cab 31, steerable front, ground-engaging running wheels 32, and rear, ground-engaging running wheels 33. The frame has rigidly mounted thereon a transverse take-up drum standard 34, braced by a strut 35, and has pivotally mounted on transverse pivot pins 36 and 37, one pair at each side, a boom 38 and a dumping body 39. The pins 36 are raised by a standard 40. The frame further carries rigidly at each side a hollow boom abutment post 41 which is secured against longitudinal tilting by inclined tension braces 42 and 43.

As appears further in FIGURE 3, each post 41 contains a recessed abutment plate 44 for engagement by an arm 45 which projects rigidly from the boom, there being one such arm on each side of the boom. The posts 41 carry inclined guide plates 46, rigidly attached by gussets 46a, for guiding the arms 45 laterally inwards into the hollow posts. Similarly, the dumping body 39 carries at each side, at the top of a vertical, channel-shaped reinforcing post 47, an inclined guide plate 48 rigidly fixed to the body 39, for guiding the arms 45 laterally outwards. The dumping body is provided at the rear with a dumping gate, not shown, of any suitable or known design, to open when the dumping body 39 is tilted rearwardly about the pins 37. The dumping body carries at the front, at each side thereof, a hoisting bracket 49 having suitable means, such as a transverse pin 50 with retaining means, for attaching thereto an end of a dumping cable 51, the said end being provided with a suitable attachment means, such as a hook 52 shown in FIGURE 5. One such dumping cable 51 is provided at each side of the vehicle and each said cable extends over a separate idler sheave 53 which is journalled at the corresponding side of the boom. The other end of each cable 51 carries a connector, such as a loop element 54 to be described in connection with FIGURES 8 and 9. When the vehicle is in travelling position, as shown in solid lines in FIGURES 1 and 3, the boom is in its extreme forward position, with its projecting arms 45 resting on the recessed plates 44, and held in this position by a boom cable 55 at each side. Cables 55 extend from connectors 56 on the boom corners over idler sheaves 57 journalled on the drum standard 34, and are wound on take-up drums 58, of which only the drum on the left side appears. The boom cables 55 carry connectors 59, spaced forwardly from the boom as shown, and when the vehicle is in travelling position the ends of the dumping cables 51 are attached temporarily to these connectors by their attachment means 52 and connectors 54. The connectors 59 will be further described with reference to FIGURES 10–12.

An extensible hydraulic ram 60 is pivotally connected at each side of the vehicle frame on a transverse pivot pin 61 and has its downward pivotal movement limited by an abutment 62 mounted on the vehicle frame. The boom carries at each side a rearwardly directed, concave abutment 63 positioned for engagement with the rear end of the ram 60 upon extension of the latter. When the ram is extended the abutment positions the ram angularly in the vertical plane, and when the boom is pushed rearwardly beyond its dead center, the boom moves by gravity beyond the limit of the expansion stroke of the ram, under control of the boom cables 55, to the dotted line position. When the abutments 63 move away from the ram end the ram is supported by the abutment 62 in position to be again engaged by the abutments 63.

The vehicle frame optionally carries at each side a downwardly and rearwardly directed abutment or stop 64 for facilitating positioning of the truck upon backing by engagement with a receptacle, such as a hopper 65 shown in dotted lines in FIGURE 5, into which the load from the dumping body 39 is to be dropped.

Referring to FIGURES 1, 13, and 19, the vehicle is coupled at 66 to the draw-bar 67 of a full trailer which has a trailer frame 68, rear ground-engaging running wheels 69, steerable, front ground-engaging wheels 70 which are journalled on axles fixed to a dolly platform 71, a dumping body 72 which is fixed to the trailer frame without relative tilting action, and forwardly converging frame extensions 73 and 73a. The dolly platform or axle tree 71 is pivoted to the trailer frame in supporting relation about a vertical axis at 74. The draw-bar, which includes rearwardly diverging side members 75 and 75a, is pivotally secured to the dolly platform at its rear ends on transverse pivot pins 76 and 76a and is pivotally connected at its front end about a transverse pin 77 which forms a part of the coupler, to be described. The coupler includes a vertical pin 78 to which the front end of the draw-bar is pivotally secured by a doughnut ring 79 fixed to the draw-bar. This permits the draw-bar to swing about the pin 78 and, hence, enables steering of the trailer.

By virtue of the pivotal movements about the horizontal pins 76, 76a and 77, the draw-bar is articulated in the vertical plane relatively to the vehicle and trailer and these parts can be jack-knifed, as appears in FIGURES 2, 4 and 5. The dumping body 72 is provided at its rear with a dumping gate, not shown, of any suitable or known design and adapted to open when the dumping body is tilted, together with the trailer, as appears in FIGURE 4. The draw-bar carries, at each side, a downwardly and rearwardly directed abutment 80, positioned for engagement by a corresponding downwardly and forwardly directed abutment 81 which is fixed to the dolly platform 71. The engaged position is shown in FIGURES 4 and 5.

Referring to FIGURES 1, 16 and 18–20, the front ends of the trailer frame extensions 73, 73a, are joined by a transverse plate 82 and carry a transverse coupling pin 83 which is removably mounted in laterally spaced, parallel plates 84 fixed to the extensions and to the plate 82. A hoisting link 85 is detachably and pivotally retained by the pin 83 and carries an idler sheave 86. A hoisting cable 87 passes over this sheave and has the ends thereof secured near the corners of the boom by connectors which are formed by annular plates 88 which are fixed to a transverse shaft 89 mounted in the side members 90, 90a, of the boom and define cable grooves the planes of which converge toward the sheave 86. The length of the cable 87 is such that it has some slack when the boom is in its rearmost position, shown in dotted lines in FIGURE 1, but is taut when the boom is tilted forwardly by its cables 55, as is shown in FIGURES 2, 4 and 5, for lifting first the front end and, later, the entire trailer. When the boom is in its extreme forward position, with the trailer on the ground, and the vehicle-trailer combination is in travelling condition as appears in solid lines in FIGURE 1, the link 85 is separated from the pin 83 by withdrawing the latter and the link is secured to the boom in any suitable manner, not shown.

Referring to FIGURES 6, 7, 8 and 9, the take-up drum mechanism includes the drum standard 34, which extends transversely across the vehicle in front of the dumping body 39, only the part at the left side of the vehicle appearing in FIGURE 7. The standard carries a principal drive shaft 91, coupled by a worm drive 92 to a motor 93 of any suitable type, such as a nelectric or a hydraulic motor, situated at the center of the standard. On each side of the drive 92 one of the take-up drums 58 is mounted for free rotation about the shaft 91. Also mounted on the shaft 91 for free rotation on each side of the drive is a dumping winding drum 94. The drums 58 and 94 carry jaw clutches 95 and 96, adapted for cooperation with a slidable clutch member 97 that is splined to the drive shaft 91 for rotation therewith and is engageable selectively with either the clutches 95 or 96 of the drum 58 or 94. The clutch member 96 on each of the drive is shifted by a lever 98 which is pivoted to a support 99 and engages flanges on a drum 100 on the clutch member. The lever 98 on each side of the standard 34 is actuated by any suitable means, such as a handle 101, at the end of a control link 102, and the said levers may be interconnected to cause the clutch members 97 on the two sides to engage simultaneously either the drums 58 or 94. The boom take-up drum 58 at each side has a serrated flange 103 which cooperates with a pawl 104 having handle 105 to prevent unwinding of the drums 58 unless the pawls are released. The pawl 104 at each side is pivoted on a pin 106 on the vehicle frame and, when tilted clockwise as seen in FIGURE 6, rests on a stop 107 which is carried by the frame 30. These pawls can be pivoted about the pins 106 to release the drums 58 to unwind the cables 55, this action taking place when the clutch member 97 is engaged with the clutch jaws 95 to control the rotation of the drums 58. It is understood that such a pawl mechanism is provided on each side of the vehicle.

Also journalled on the standard 34 at each side thereof on a shaft 108 is an auxiliary winding drum 109, a vertical support 110 being provided for each shaft 108. This shaft also carries the idler sheave 57 mounted for free rotation thereon. An auxiliary cable 111, fixed at one end thereof to the drum 94 and at the other end to the drum 109, and adapted to be wound about one or the other drum, transmits torque from the former drum to the latter. The drum 109 is rotationally connected to a dumping take-up drum 112 by a sleeve 113, rotationally supported by the shaft 108, so that rotation of the drum 94 tending to wind the cable 51 onto the drum 102 is transmitted to the latter drum. The drum 112, further illustrated in FIGURES 8 and 9, includes radial flanges 114, one of which has an inclined substantially radial slot 115 for receiving the dumping cable 51. A resilient leaf spring 116 is mounted on the drum on the side of the slotted flange outside of the winding face and has its end directed toward the knee of a hook 117 which is fixed to the drum 112 and shaped to receive the loop 54 at the end of the cable 51. This cable end can be attached to the drum 112 by laying the cable in the slot 115 and hooking the loop 54 over the hook 117, depressing the spring 116 during attachment. The end of the spring prevents the loop from becoming disengaged from the hook. The loop can be removed from the hook by depressing the spring 116.

The connector 59, which is clamped to each boom cable 55, is shown in detail in FIGURES 10 and 12, and the cooperating loop at one end of the cable 51 is shown above the former view in FIGURE 11. The connector is of two parts, united by clamping screws, not shown: the upper part provides a hook 118 which is shaped to receive the loop 54 at the end of the cable 51, and carries a resilient leaf spring 119 having the free end thereof directed toward the knee of the hook to prevent the loop 54 from being disengaged should slack occur. The loop 54 can be disconnected from the hook 118 by depressing the spring 119. The lower part of the connector includes a lug 120 having a hole 121 of size to receive the hook 52 at the other end of the dumping cable 51.

Referring to FIGURES 1 and 16–18, the boom includes the side members 90 and 90a, interconnected by transverse and diagonal braces 122, 123, and having fixed to their lower ends plates 124 with holes to receive the pivot pins 36 in the standards 40. The outer ends of the side members carry plates 125, 125a, in which the sheaves 53 are journalled. The shaft 89 is also rotationally mounted in these side members.

Referring to FIGURES 13 and 21–23, showing the coupling member, the rear end of the vehicle frame 30 includes a transverse box girder 126 carrying, near its ends, rearwardly projecting connectors 127, 127a, for attaching immobilizing cables 128, 128a, to be described. The coupler 66 is mounted at the center of the girder 126 and includes: (1) a slide frame 129 having a horizontal floor plate 130 and a vertical, transverse plate 131 extending downwards from the rear edge of the former; (2) a tightening screw 132 which is threadedly engaged to a collar 133, the latter being fixed to the box girder 126, the said screw having a handwheel 134; and (3) a U-shaped slide element 135 adapted to be supported on the floor plate 130 and which has holes 136 aligned on a transverse axis formed in its bifurcations for receiving the horizontal pin 77 by which it is pivotally connected to a link 137, whereby the element 135 and link 137 move in unison. The link 137 is bifurcated and has vertically aligned holes for receiving the pin 78, by which it is connected to the draw-bar. The slide frame 129 further includes: a pair of vertical, laterally spaced side plates 138, 138a, having an interval slightly greater than the width of the slide element 135 and secured to the girder 126, e.g., through the floor plate 130 to be a part of the vehicle; inwardly extending, downwardly and rearwardly inclined flanges 139, 139a at the rear edges of the side plates for engaging the rear edges of the slide-element bifurcations and thereby preventing rearward motion of the said element relatively to the slide frame; and, at the lower edges of the side plates, horizontal, inwardly extending flanges 140, 140a, for supporting the element 135 after falling rearwardly of the floor plate 130. The tightening screw 132 extends longitudinally rearwards through an oversized hole in the plate 131 for engaging the front of the element 135.

To couple the trailer to the vehicle, the screw 132 is retracted from the plate 131 and the slide element 135 is placed manually on the floor plate 130, the vehicle and trailer being initially positioned closer together than when coupled. The vehicle is thereafter moved slowly forward, causing the slide frame to slide forwards relatively to the slide element 135 until the latter falls by gravity onto the flanges 140, 140a. The screw 132 is then tightened by its handwheel 134 to move the slide element 135 firmly against the flanges 139, 139a, which, by virtue of their inclinations, prevent upward displacement of the slide element from the slide frame.

Referring to FIGURES 13, 14 and 15, the immobilizing cables 128, 128a, extend about opposite sides of corresponding idler sheaves 141 which are freely rotatable on a vertical trunion pin 142 fixed to a plate 143 on the draw-bar. These cables thence extend about idler sheaves 144 and 144a, respectively, and have their rear ends fixed to a longitudinally movable abutment plate 145. This plate has apertures through which these cables extend freely between the sheaves 141 and 144 or 144a. The sheaves 144, 144a, are adapted to engage the rear face of the abutment plate 145, as shown in FIGURE 13, to be moved rearwardly thereby. These sheaves have their trunion pins and housings connected to the ends of an equalizing cable 146 which is looped about a rearwardly biased idler sheave 147. The sheave 147 is urged rearwardly by a weak spring 148 which is fixed to a cross member 149 on the draw-bar. The abutment plate 145 is secured to the front end of an extensible and contractible hydraulic ram 150 which is fixed at the rear end thereof to a cross plate 151 fixed to the draw-bar.

Contraction of the ram 150, to the position shown in FIGURE 13, pulls the plate 145 rearwardly toward the trailer, engaging the sheaves 144 and 144a and thereby tightening the cables 128 and 128a. This immobilizes the draw-bar against lateral swinging motion about the vertical pin 78. When the ram 150 is extended to the position shown in FIGURE 14, the cables 128 and 128a are relieved of tension beyond that imposed by the weak spring 148, and the draw-bar is freed to rotate about the pin 78. The function of the weak spring 148 is merely to take slack out of the cables 128 and 128a, as well as of the cable 146; it does not impose on these cables a force sufficient to prevent swinging movement of the draw-bar about the pin 78 when the ram 150 is extended.

FIGURE 14 illustrates the conditions of the cables when swinging motion of the draw-bar occurs upon a turning movement of the towing vehicle to the left. The connector 127 at the left side of the vehicle then moves rearwardly relatively to the connector 127a, approaching the trailer, permitting the sheave 144 to move rearwardly in response to the biasing tension of the cable 146 and the spring 148, to take slack out of the cables 128 and 146.

Operation of the vehicle-trailer combination is as follows:

(1) In travelling condition, shown in FIGURE 1, the boom 38 is in its forward position, with its arms 45 resting on the abutment plates 44 within the posts 41 and secured by the boom cables 55, which are tightened by the drums 58, secured by the pawls 104. The hoisting link 85 is detached from the trailer extension 73 and is secured to the boom.

(2) To dump the load, the combination is maneuvered, e.g., backed into a position to place the trailer dumping body 72 into the desired position. The boom 38 is tilted rearwardly by paying out the boom cables 55 from the drums 58, the pawls 104 being released by their handles 105, and operating the extensible rams 60 to engage the abutments 63 and push the boom rearwards beyond top dead center. During this movement the motor 93 may be operated and the clutch member 97 engaged with the jaw clutches 95 to control the rearward boom movement, during which the boom leaves the rams 60 and moves by gravity to the dotted-line position of FIGURE 1. The ram 150 is contracted to pull the abutment plate 145 rearwards, engaging the sheaves 144 and 144a to tighten the immobilizing cables 128 and 128a. The hoisting link 85 is connected to the trailer frame extensions 73, 73a, by the pin 83. The motor 93 is then operated in a direction to wind the cable 55 onto the drum 58 and pull the boom forwards, thereby raising the front end of the trailer, as is shown in FIGURE 2. Continued movement of the boom tilts the trailer on its rear running wheels 69 sufficiently to cause the trailer dumping gate to open and to dump the load from the body 72 onto the ground. This may occur in the position shown in FIGURE 2 or between this position and that shown in FIGURE 4.

(3) The trailer is next lifted bodily off the ground by continuing or resuming operation of the motor 93 to tilt the boom forwardly. When the parts attain the positions shown in FIGURE 4 the abutment 80 on the draw-bar is engaged by the abutment 81 on the trailer. Beyond these engaged positions of the abutment the trailer is raised fully off the ground, as is shown in FIGURE 5. The vehicle is then moved into the desired position on the ground to dump its load, e.g., by moving it rearwardly to dump its load near that dumped by the trailer or against a hopper 65 by means of the stop abutments 64. Otherwise, the vehicle can be backed to dump its load over a chasm or pit into which the trailer load was dumped.

While the trailer is raised in the position shown in FIGURE 5 the immobilizing cables 128, 128a, are taut as appears in FIGURE 13, thereby preventing swinging movement of the draw-bar about the pin 78 and insuring stability to the trailer, which is prevented from moving laterally relatively to the draw-bar by the engaged abutments 80 and 81.

(4) The loop 54 and hooks 52 at the ends of the dumping cables 51 are next detached from the connectors 59 on the boom cables 55, and the pawls 104 are engaged to the serrated flanges 103 to secure the drums 58 against unwinding the boom cables. The hooks 52 are then attached to the pins 50 on the front end of the dumping body 39 and the loops 54 are attached to the hooks 117 on the dumping take-up drums 112. The levers 102 are moved to engage the clutch members 97 to the jaw clutches 96 of the drums 94 and the motor 93 is operated to wind the auxiliary cables 111 onto the latter drums. This causes the sleeves 113 to rotate the drums 112 and wind up the dumping cables 51, which pull up the front end of the body 39 to tilt it to the position shown in FIGURE 5. The tail gate (not shown) opens as the vehicle bulk load is discharged onto the ground or into the hopper 65.

(5) The empty vehicle may, if desired, be moved by its running wheels 32, 33, on the road while the trailer is raised to clear the trailer from the load dumped from the vehicle dumping body 39, or to position the trailer above a solid roadway, removed from a chasm into which one or both loads were dumped. Such movement may occur before or after lowering the dumping body 39 to the position shown in FIGURES 1, 2 and 4 by reversing the direction of movement of the motor 93 and shaft 91 to unwind the cables 111 and 51. After the latter cable is unwound its ends are again connected to the connectors 59.

(6) The parts are restored to the positions shown in FIGURE 1, with the trailer on the ground and all parts in travelling position, by performing the steps 4, 3 and 2 in the reverse of the order stated.

Although not shown in the drawings, it is understood that the hydraulic rams 60 and 150, as well as the motor 93, are provided with suitable means for supplying hydraulic fluid under pressure, such means being well understood in the art.

I claim as my invention:

1. A bulk-hauling and dumping road vehicle adapted to pull a bulk-hauling and dumping trailer and to raise at least a part of said trailer off the ground while said trailer extends rearwards from the vehicle, said vehicle comprising:

(a) a chassis frame, ground engaging wheels, and a dumping body mounted on said frame for rearward tilting movement, (b) coupling means at the rear of said frame for attachment to a coupling element of said trailer, (c) a boom pivotally mounted on a rear part of said frame about a transverse pivot axis and adapted for connection to said trailer, (d) power means on said frame for tilting said boom forwards and thereby to raise the connected trailer part and for tilting said dumping body following said forward movement of the boom, said power means including
(1) take-up drum means mounted on said frame and including powered driving means for operating the drum means,
(2) boom cable means extending between said boom and said drum means for pulling the boom forwards, and
(3) a sheave mounted on said boom and dumping cable means extending from a forward part of said dumping body about said sheave to said drum means to tilt said dumping body, and
(e) at least one extensible hydraulic ram connected between said frame and said boom for moving said boom rearwardly.

2. Vehicle as defined in claim 1 wherein:
(a) each of said cable means includes a pair of cables which are situated, respectively, at opposite sides of the vehicle, and
(b) said power means comprises
(1) a rotatable shaft mounted transversely to the vehicle frame and coupled to a drive motor,
(2) at each side of said frame, a first and a second take-up drum, respectively connected to said boom cable means and to said dumping cable means at the said sides, and
(3) clutch means between said shaft and at least one drum on each side of the frame for operating the first drum on each side independently of the second drum.

3. Coupling means for coupling the draw-bar of a trailer to a road vehicle which comprises:
(a) a slide frame including a guide for guiding a coupling element longitudinally for sliding motion thereon and supporting said element, said frame having a depression shaped to permit downward falling motion of the said coupling element following said sliding motion,
(b) a coupling element shaped to slide in said frame, and
(c) locking means on said slide frame for securing the coupling element to said frame after the said falling movement of the said element, including a screw extending substantially parallel to said guide means and having threaded engagement with the said frame and having a part thereof engageable with the coupling element.

4. Immobilizing means for preventing swinging motion of a draw-bar of a trailer relatively to a towing vehicle to which said draw-bar is coupled, comprising:
(a) a pair of immobilizing cables secured respectively to points on the vehicle on opposite sides of the location at which said draw-bar is coupled to the vehicle and extending rearwardly and convergingly to the draw-bar, and
(b) single power-operated means for selectively applying tension to both said immobilizing cables relatively to the draw-bar to immobilize the latter and for releasing both said cables to permit swinging motion of the draw-bar relatively to the vehicle including
(1) tensioning means axially movable on said draw-bar and attached to said cables in tensioning relation, and
(2) a power device mounted on said draw-bar for moving said tensioning means relatively to said draw-bar to apply tension to said cables.

5. A bulk-hauling and dumping road vehicle adapted to pull a bulk-hauling and dumping trailer and to raise at least a part of said trailer off the ground while said trailer extends rearwards from the vehicle, said vehicle comprising:
(a) a chassis frame, ground engaging wheels, and a dumping body mounted on said frame for rearward tilting movement,
(b) coupling means at the rear of said frame for attachment to a coupling element of said trailer,
(c) a boom pivotally mounted on a rear part of said frame about a transverse pivot axis and carrying coupling means for connection of tension means extending to said trailer, and
(d) power means on said frame for tilting said boom forwards and thereby to raise the connected trailer part and for tilting said dumping body following said forward movement of the boom, said power means including
(1) first and second take-up drums mounted on said frame and including power means for operating the said drums and clutch means for operating said first drum independently of said second drum,
(2) boom cable means extending between said boom and said first take-up drum for pulling the boom forwards, said cable means carrying a connector fixed thereto between said drum and boom,
(3) a sheave mounted on said boom, and
(4) dumping cable means extending about said sheave and having releasable connectors at the ends thereof detachably secured to said connector on the boom cable means,
(5) said connectors on the dumping cable means, when released from said connector on the boom cable means, being respectively connectible to said dumping body and to the second take-up drum.

6. Vehicle as defined in claim 5 wherein the power means for operating the said drums comprises:
(a) an auxiliary cable drum mounted for rotation together with one of said take-up drums,
(b) a driving take-up drum coupled to be driven by said power means, and
(c) an auxiliary cable wound on said auxiliary drum and on said driving drum for rotating the former drum.

7. The combination of a bulk-hauling and dumping road vehicle and a dumping trailer coupled thereto, said vehicle being adapted to raise at least the front part of said trailer off the ground while said trailer extends rearwards from the vehicle and is coupled thereto, said combination comprising:
(a) a vehicle chassis frame, ground engaging wheels, and a dumping body mounted on said frame for rearward tilting movement,
(b) a trailer comprising a trailer frame, rear wheels, front wheels adapted for steering motion, and a draw-bar adapted to pull the trailer and steer said front wheels, said draw-bar having pivoted connection to the trailer about a horizontal axis and having a coupling element secured to the front end thereof,
(c) coupling means at the rear of said vehicle frame attached to said coupling element of the draw-bar, said coupling element and coupling means providing a swinging joint about a horizontal axis for vertical articulation of the draw-bar relatively to the vehicle frame and trailer and, further, providing for lateral swinging movement of the draw-bar on a vertical axis relatively to the vehicle frame,
(d) a boom pivotally mounted on a rear part of said vehicle frame about a transverse pivot axis,
(e) a tension member interconnecting an outer part of said boom to a front part of said trailer,
(f) power means on said vehicle frame for tilting said boom forwards and thereby to raise the connected part of the trailer and tilt said trailer dumpying body, and for tilting said dumping body on the vehicle, and
(g) means for immobilizing said swinging movement of the draw-bar about a vertical axis relatively to the vehicle frame, which includes:
(1) a pair of immobilizing cables secured respectively to points on the vehicle frame on opposite sides of said coupling means and extending rearwardly and convergingly to the draw-bar and connected thereto, and (2) single power means for selectively applying tension to both said immobilizing cables relatively to the draw-bar and for releasing both said cables from tension, thereby to selectively immobilize said draw-bar and permit said swinging motion.

8. The combination defined in claim 7 wherein said means for applying tension to the immobilizing cables comprises:
(a) a pair of sheaves mounted on said draw-bar and resiliently biased rearwardly relatively thereto,
(b) said immobilizing cables passing rearwardly from the vehicle frame about said biased sheaves and having their ends secured with respect to the draw-bar, and
(c) an axially movable abutment member on said draw-bar constructed to engage said biased sheaves to effect axial movement thereof relatively to the draw-bar.

9. The combination defined in claim 8 wherein:
(a) the ends of said immobilizing cables, beyond said biased sheaves, are secured to said abutment member,
(b) the said abutment member is positioned to move said biased sheaves rearwardly upon a rearward movement of said abutment member, and
(c) said means for applying tension further includes
   (1) power means on the draw-bar for moving said abutment member rearwardly into engagement with the biased sheaves to effect rearward movement thereof, and
   (2) said sheaves are biased rearwardly by mechanism including an idler sheave connected to the draw-bar by a light, resilient spring and a biasing cable having the ends thereof connected to said biased sheaves and passing about said idler sheave.

10. The combination of a bulk-hauling and dumping road vehicle and a dumping trailer coupled thereto, said vehicle being adapted to raise at least the front part of said trailer off the ground while said trailer extends rearwards from said vehicle and is coupled thereto, said combination comprising:
(a) a vehicle chassis frame, ground engaging wheels, and a dumping body mounted on said frame for rearward tilting movement,
(b) a trailer comprising a trailer frame, rear wheels, front wheels adapted for steering motion, and a draw-bar adapted to pull the trailer and steer said front wheels, said draw-bar having a pivoted connection to the trailer about a horizontal axis for vertical swinging motion, and having a coupling element secured to the front thereof,
(c) coupling means at the rear end of said vehicle frame attached to said coupling element of the draw-bar said coupling element and coupler providing a swinging joint about a horizontal axis for vertical articulation of the draw-bar relatively to the vehicle frame and trailer and, further, providing for lateral swinging movement of the draw-bar about a vertical axis relatively to the vehicle frame,
(d) a boom pivotally mounted on a rear part of said vehicle frame about a transverse pivot axis,
(e) a tension member interconnecting an outer part of said boom to a front part of said trailer, including a detachable connector, and (f) power means on said vehicle frame for tilting said boom forwards and thereby to raise the connected trailer part and for simultaneously tilting said dumping body on the trailer, and for tilting the dumping body on the vehicle following said forward movement of the boom, said power means including:
   (1) take-up drum means mounted on said vehicle frame and including power-driven means for operating the drum means,
   (2) boom cable means extending between said boom and said drum means for pulling the boom forwards, and
   (3) a sheave mounted on said boom and dumping cable means passing over said sheave and interconnecting said vehicle dumping body and said take-up drum means for tilting said vehicle body.

11. Immobilizing means for preventing swinging motion of a draw-bar of a trailer relatively to a towing vehicle to which said draw-bar is coupled, comprising:
(a) a pair of immobilizing cables secured respectively to points on the vehicle on opposite sides of the location at which said draw-bar is coupled to the vehicle and extending rearwardly and convergingly to the draw-bar, and
(b) single power-operated means for selectively applying tension to both said immobilizing cables relatively to the draw-bar to immobilize the latter and for releasing both said cables to permit swinging motion of the draw-bar relatively to the vehicles, including
   (1) a pair of biased sheaves mounted on said draw-bar, an idler sheave, resilient means biasing said idler sheave rearwardly relatively to the draw-bar, and a biasing cable extending about said idler sheave and having the ends thereof connected to said biased sheaves,
   (2) an axially movable abutment member on said draw-bar positioned to engage said biased sheaves and move them rearwardly, and
   (3) cylinder-and-piston means connected between said draw-bar and an abutment member for effecting axial movement of said member along the draw-bar,
(c) said immobilizing cables extending from said points on the vehicle about said biased sheaves and thence to said abutment member.

References Cited by the Examiner

UNITED STATES PATENTS

| | | | |
|---|---|---|---|
| 1,546,261 | 7/25 | Spencer | 298—8 |
| 1,573,320 | 2/26 | Kline | 280—474 |
| 1,617,709 | 2/27 | Gifford et al. | 280—477 |
| 1,817,132 | 8/31 | Dondlinger | 298—21 |
| 2,344,921 | 3/44 | McDaniel | 280—474 |
| 2,482,413 | 9/49 | Gibson | 214—44 |
| 2,867,339 | 1/59 | Nelson | 214—517 |
| 2,914,194 | 11/59 | Brown | 280—150 X |
| 3,103,288 | 9/63 | Pruss | 214—44 |
| 3,152,814 | 10/64 | Wegener et al. | 280—479 |

FOREIGN PATENTS

| | | |
|---|---|---|
| 492,756 | 5/53 | Canada. |

ARTHUR L. LA POINT, *Primary Examiner.*

R. DAVID BLAKESLEE, *Examiner.*